United States Patent [19]
Yamanaka et al.

[11] Patent Number: 5,345,675
[45] Date of Patent: Sep. 13, 1994

[54] METHOD OF MOUNTING WHEEL TO VEHICLE

[75] Inventors: Yasurou Yamanaka; Junichi Yamanaga; Akira Morizono; Akira Miyazaki; Noriyuki Unose, all of Sayama, Japan

[73] Assignee: Honda Giken Kogyo Kabushiki Kaisha, Tokyo, Japan

[21] Appl. No.: 16,260

[22] Filed: Feb. 11, 1993

[30] Foreign Application Priority Data

Feb. 13, 1992 [JP] Japan .................. 4-026642
Feb. 13, 1992 [JP] Japan .................. 4-026646

[51] Int. Cl.$^5$ ............... G05B 19/417; B62D 65/00
[52] U.S. Cl. ................... 29/894.3; 29/468; 356/153
[58] Field of Search .............. 29/894.3, 205, 468; 356/153, 400

[56] References Cited

U.S. PATENT DOCUMENTS 5,125,298  6/1992  Smith ..................... 81/57.37

FOREIGN PATENT DOCUMENTS

0209709  1/1987  European Pat. Off. .
62-302810 11/1987  Japan .

Primary Examiner—Mark Rosenbaum
Assistant Examiner—Kenneth J. Hansen

[57] ABSTRACT

A pair of second cameras mounted on a robot are located in front of, and symmetrically with respect to the center of a wheel hub of a vehicle, according to approximate coordinates of the center of the wheel hub calculated from an image of the wheel hub taken by a first camera. Revised coordinates of the center of the wheel hub, a rotational displacement from a standard rotational position of the wheel hub, and a turning angle of the wheel hub toward the right or left with respect to a progressive direction of the vehicle are calculated from the images obtained by the second cameras. A wheel is then automatically mounted to the wheel hub by the robot, according to the results of calculation.

4 Claims, 7 Drawing Sheets

CAMERA 38          CAMERA 40

AVERAGED BOLT CIRCLE

FIG.7C

ELLIPSE D2 FOR CAMERA 40

FIG.7B

ELLIPSE D1 FOR CAMERA 38

FIG.7A

METHOD OF MOUNTING WHEEL TO VEHICLE

BACKGROUND OF THE INVENTION

1. Field of the Invention

The present invention relates to a method of automatically mounting a wheel to a wheel hub of a vehicle being conveyed along an assembly line, by detecting the center of the wheel hub, angular positions of hub bolts and a turning angle of the hub face.

2. Description of the Related Art

An automatic assembly system for mounting parts to a vehicle being conveyed on an assembly line by industrial robots has been progressing in the motor manufacturing industry. There, a method of acquiring information about images of wheel hubs, taken by cameras each having a charge-coupled device (CCD) has been employed in a wheel mounting robot for automatically mounting wheels to their corresponding wheel hubs. According to the method, the positions of hub bolts are detected by computation from the read image information.

However, in this type of detecting method, as it is difficult to locate the CCD cameras in the vicinity of the wheel hubs, the image of each wheel hub cannot be closed-up to the maximum on the screen. Therefore, the positions of the hub bolts cannot be detected with satisfactory accuracy.

On the other hand, a technical idea that a computational process is effected on read image to thereby improve the accuracy in the detection of respective positions of hub bolts, has been disclosed in Japanese Patent Application Laid-Open Publication No. 1-145288 entitled "A Method of Mounting Wheels To Vehicle", for example.

According to the above disclosure, information about images of respective wheel hubs is taken by cameras and information on a plurality of points recognized as hub bolts are detected or extracted from the images taken by the cameras. Then, recognized points identical in number to the hub bolts to be mounted are selected from the detected points. Further, a polygon formed by connecting the selected recognized points to each other by straight lines is compared with an array pattern of a predetermined polygon used as the standard. Thereafter, a combination of recognized points whose errors are held to the minimum is specified as the positions of the hub bolts.

In the conventional vehicle-wheel mounting method, however, often, when a hub face is not parallel with a reference face, the position of each hub bolt cannot be detected. When the number of hub bolts varies, i.e., when the kind of a vehicle to be assembled is changed, the method cannot rapidly meet such a situation.

Further, all the recognized points which have been detected, must be combined to produce polygons, and each of the produced polygons must be compared with the standard polygon. Therefore, the conventional wheel mounting method is time-consuming for their computation, and thus, has suffered from low productivity.

SUMMARY OF THE INVENTION

With the foregoing problems in view, it is the object of the present invention to provide a method of mounting a wheel to a vehicle conveyed along an assembly line, which makes it possible to improve the accuracy in the detection of position of hub bolts and to rapidly and reliably mount the wheel.

To achieve this object, a method of mounting a wheel is provided according to the present invention, which comprises steps of: obtaining an image of a wheel hub by first imaging means disposed on one side of the conveyed vehicle; computing coordinates of the center of the wheel hub based on the image obtained by the first imaging means; locating second imaging means mounted on the wheel mounting robot to places where respective the second imaging means are located symmetrically with respect to the center of the wheel hub, and where possible largest images of the wheel hub are obtainable by respective said second imaging means, based on information indicative of the coordinates of the center of said wheel hub; computing again the coordinates of the center of the wheel hub and a rotational position of the wheel hub based on the images obtained by the second imaging means, wherein the rotational position being an angular displacement of the wheel hub with respect to a standard rotational position thereof; and mounting the wheel to the wheel hub by the wheel mounting robot based on the revised coordinates of the center and rotational position of said wheel hub.

In the above-stated method, an approximate position of the center of the wheel hub (the target hub) is first detected based on an image taken by the first imaging means, and then, the second imaging means are located, based on the information about the center of the wheel hub, at places where the second imaging means can obtain possible largest images of the target hub.

The method further comprises steps for detecting a turning angle of the wheel hub toward the right or left of the vehicle's progressive direction by use of a ratio of the minor axis to major axis of an ellipse which is best fitted to positions recognized as heads of hub bolts in each image obtained by the second imaging means. The rotational position of the target hub is also determined with consideration of the turning angle of the hub. If the turning angle exceeds a predetermined angle, a wheel mounting disable signal is outputted.

The method also comprises steps for verifying whether or not a point recognized as a head of hub-bolt is a pseudo point by inspecting angular distances between the recognized points.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

A method of mounting a wheel to a vehicle, according to the present invention will hereinafter be described in detail with reference to the accompanying drawings in which a preferred embodiment is shown by way of illustrative example.

Figure 1:
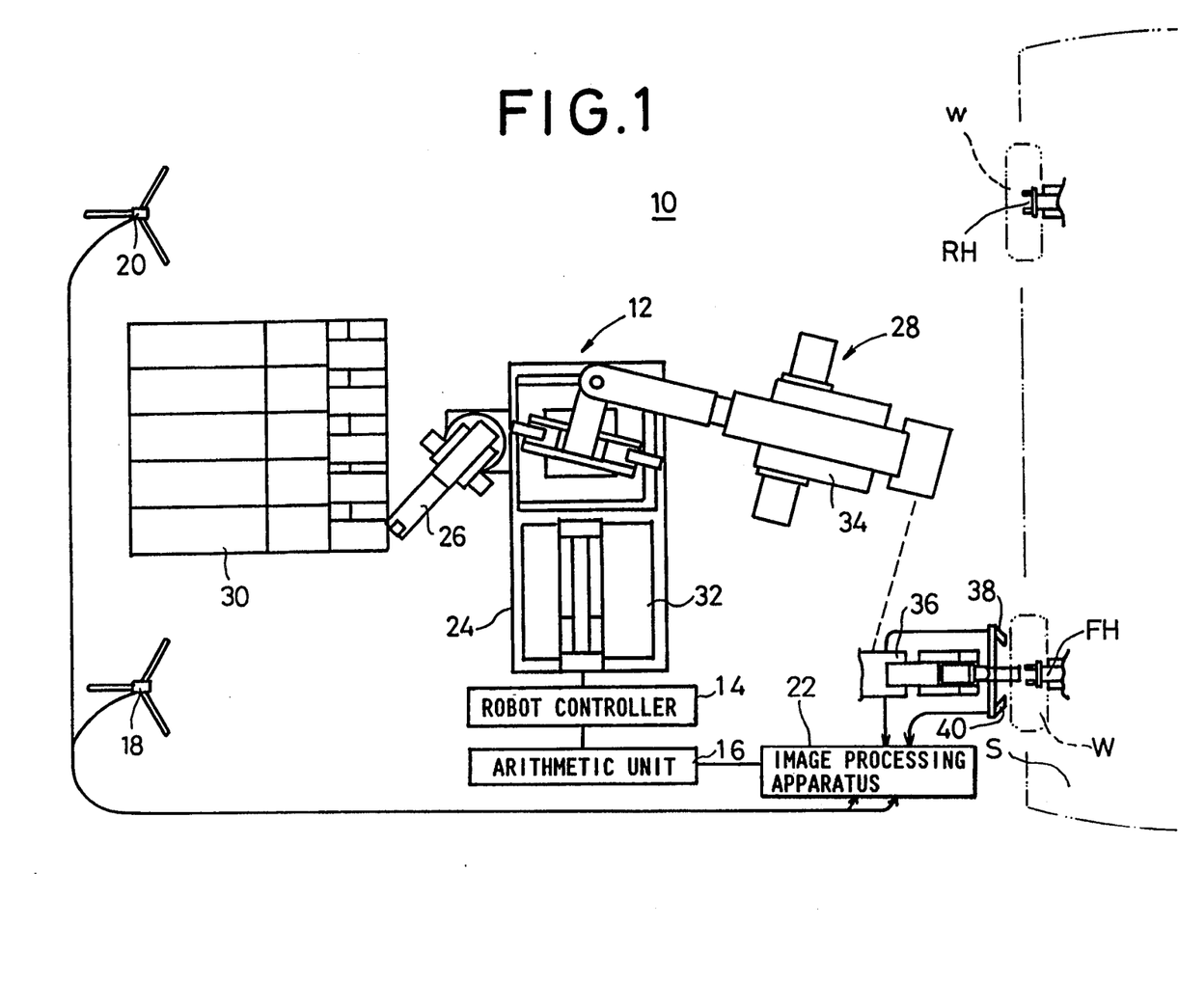
FIG. 1 is a plan view schematically showing the structure of a wheel mounting robot for effecting a wheel mounting method according to the present invention.
Figure 2:
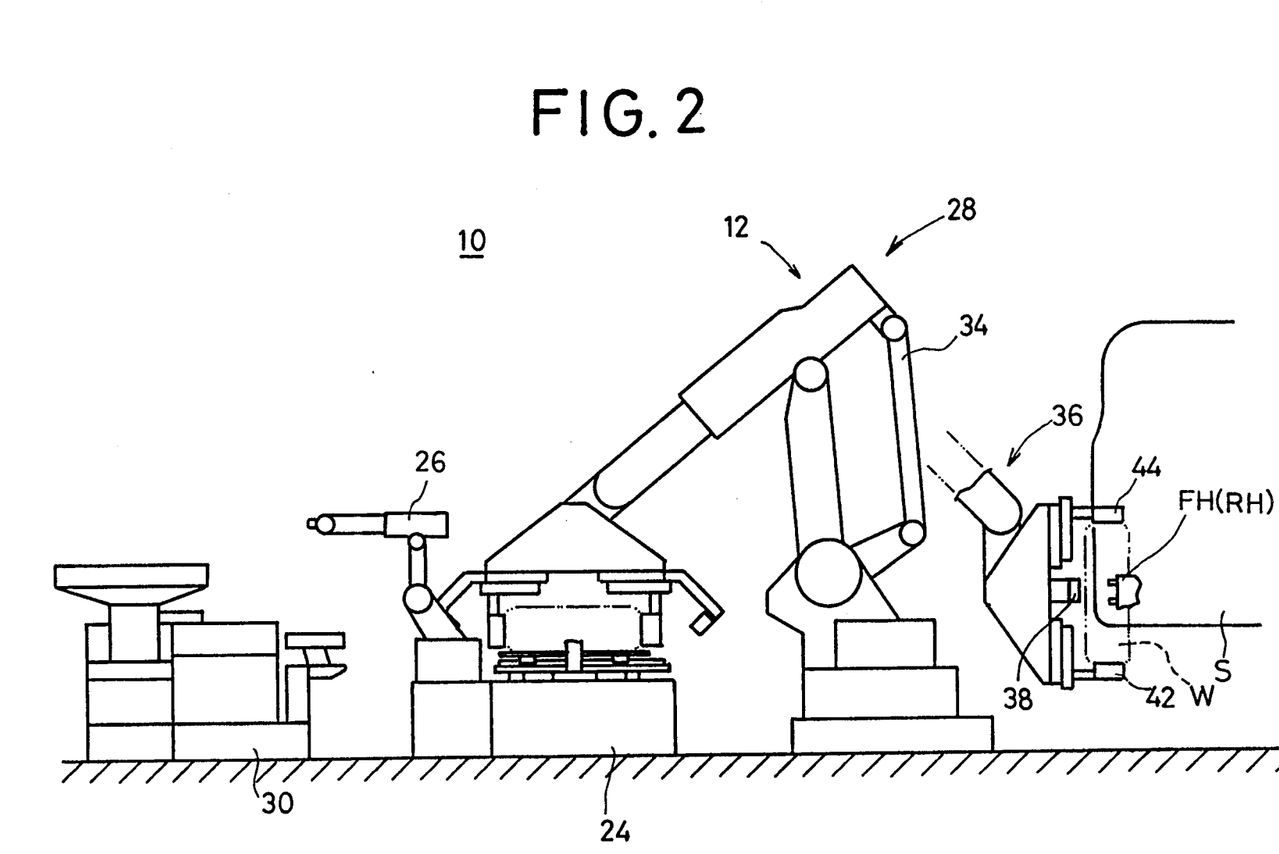
FIG. 2 is a front view schematically illustrating the structure of the robot shown in FIG. 1.
Figure 3:
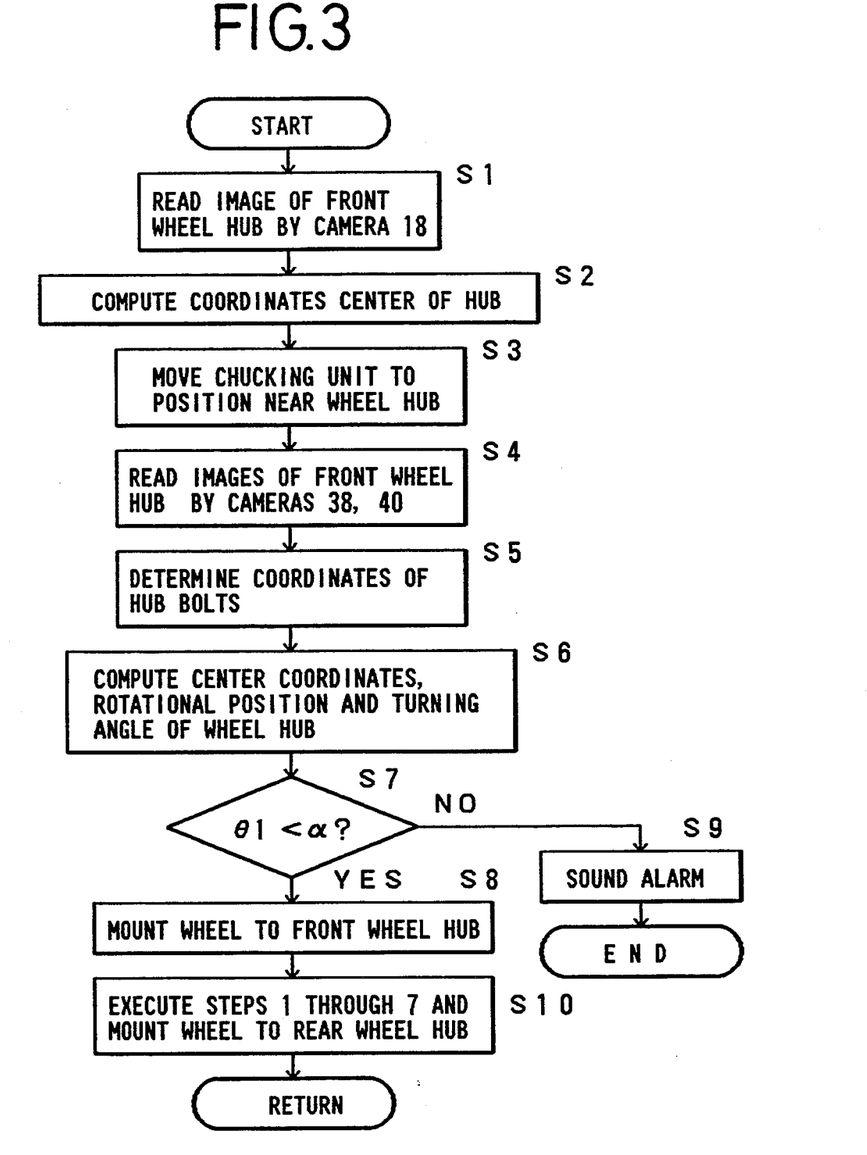
FIG. 3 is a flowchart for describing an operation for mounting a wheel to the wheel hub by the robot shown in FIG. 1.

FIG. 1 is a schematic plan view showing the structure of a wheel mounting robot which embodies the present invention. FIG. 2 is a front view of the robot shown in FIG. 1.

The wheel mounting robot 10 comprises a robot main body 12 for mounting a wheel W to a vehicle S conveyed along an assembly line, a robot controller 14 for outputting signals such as a control signal to the robot main body 12, an arithmetic unit 16 composed of a CPU and related devices, a CCD camera 18 fixed by a tripod, for taking or sensing an image of a front wheel hub FH of the vehicle S, a camera 20 for a rear wheel hub RH, and an image processing apparatus 22 for processing the image information outputted from the cameras 18, 20. Each of the cameras 18 and 20 approximately detects the center of each of the front and rear wheel hubs FH and RH.

A nut supply robot 26 and a wheel mounting robot 28 are mounted on a mounting base 24 of the robot main body 12. The nut supply robot 26 holds or grips nuts taken out from a parts feeder 30, for fixing each wheel W. The wheel mounting robot 28 grips a desired wheel W placed on a wheel placement station 32 and mounts them to their corresponding front and rear wheel hubs FH and RH. The wheel mounting robot 28 has an arm 34 and a chucking unit 36. The chucking unit 36 comprises cameras 38, 40 and chucks 42, 44 for holding a desired wheel W therebetween.

The image processing apparatus 22 processes an image information on each wheel hub, which has been taken by each of the cameras 38 and 40.

The operation of the wheel mounting robot 10 configured as above will be described below with reference to the drawings.

The vehicle S to which the wheel W is to be mounted, is first conveyed to a predetermined position adjacent to the wheel mounting robot 10. In this state, each of the front and rear wheel hubs FH and RH has a randomly selected rotational position. In addition, the front wheel hub FH may have a turning angle toward the right or left of the vehicle's progressive direction, because the steering wheel of the vehicle in this state is kept free.

Figure 5A:
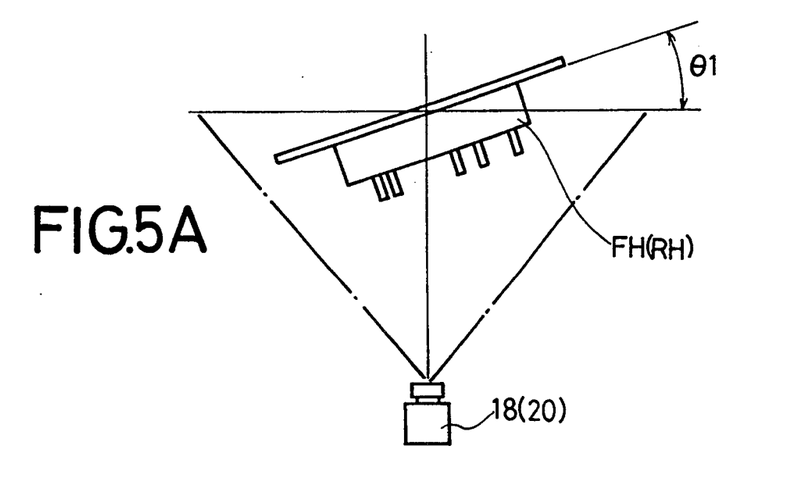
FIGS. 5A and 5B are views for describing an operation of approximately detecting the center of a wheel hub on the flowchart shown in FIG. 3.

Then, the camera 18 takes an image of the front wheel hub FH and outputs the same to the image processing apparatus 22 (see FIG. 5A) (Step S1).

Figure 5B:
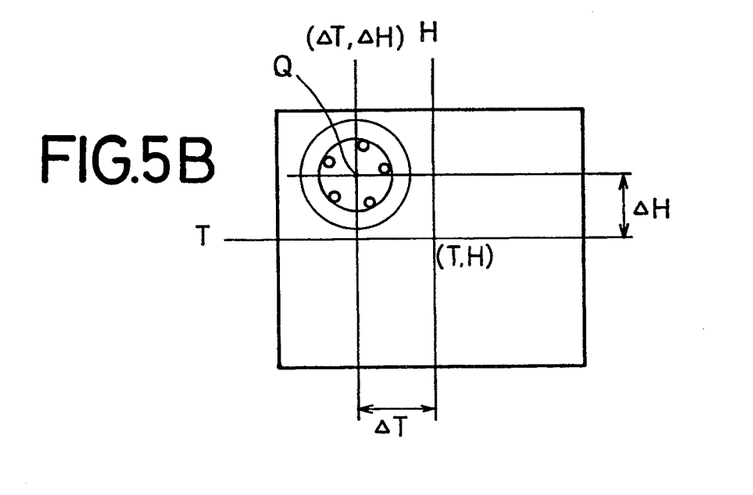

The image processing apparatus 22 approximately detects the coordinates Q ($\Delta T$, $\Delta H$) of the center of the front hub FH, without regard of the turning angle of the hub, based on the input image of the front hub FH from the camera 18 and predetermined coordinates (T, H) of the camera 18 (see FIG. 5B). Thereafter, the image processing apparatus 22 outputs the center coordinates Q to the robot controller 14 via the arithmetic unit 16 (Step S2).

The robot controller 14 drives the arm 34 of the robot main body 12 in response to information indicative of the center coordinates Q of the front wheel hub FH so as to move the chucking unit 36 mounted on the arm 34 toward the front wheel hub FH (Step S3).

At this time, a hypothetical plane formed by optical axes of the two cameras 38, 40 attached to the leading end of the chucking unit 36 crosses perpendicularly the face of the front wheel hub FH at the center Q thereof. The robot controller 14 stops movement of the chucking unit 36 when the two cameras 38, 40 are located symmetrically with respect to the center Q of the front wheel hub FH, and possible largest images of the front hub FH are obtained on respective viewing screens of the cameras 38, 40.

Figure 6A:
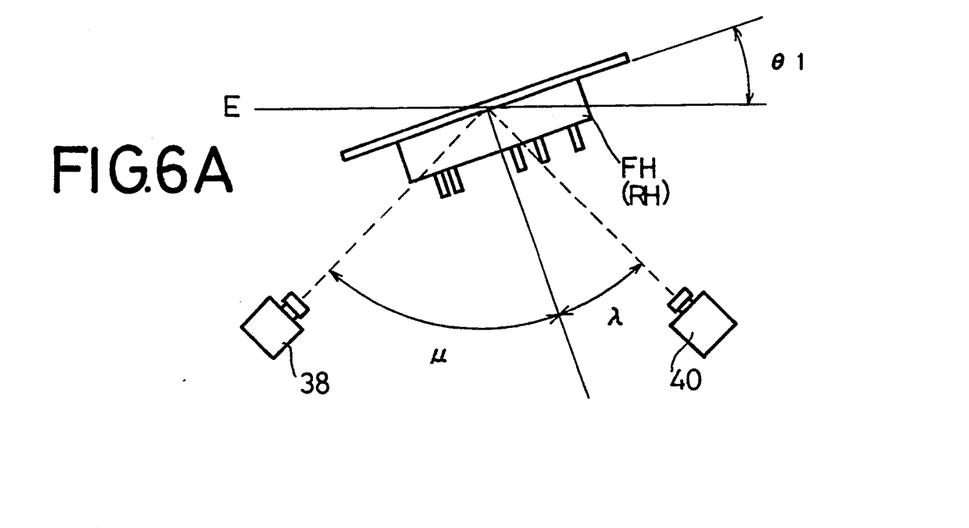
FIGS. 6A to 6C are views for describing an operation on the flowchart shown in FIG. 3, for reading an image of a wheel hub by each of two cameras.
Figure 6B:
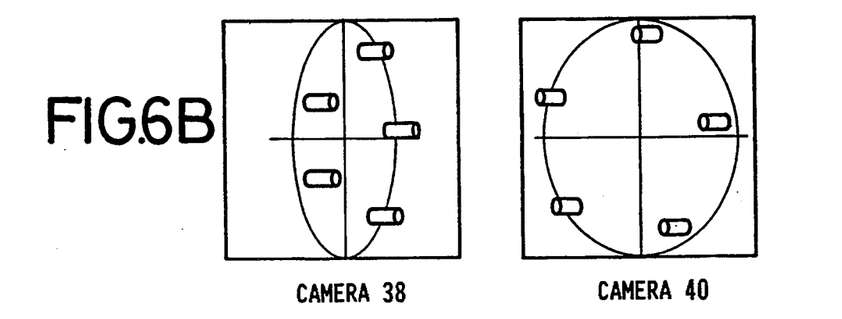

Each of the cameras 38, 40 reads information about the enlarged image of the front hub FH and outputs it to the image processing apparatus 22 (see FIGS. 6A and 6B) (Step S4).

Figure 6C:
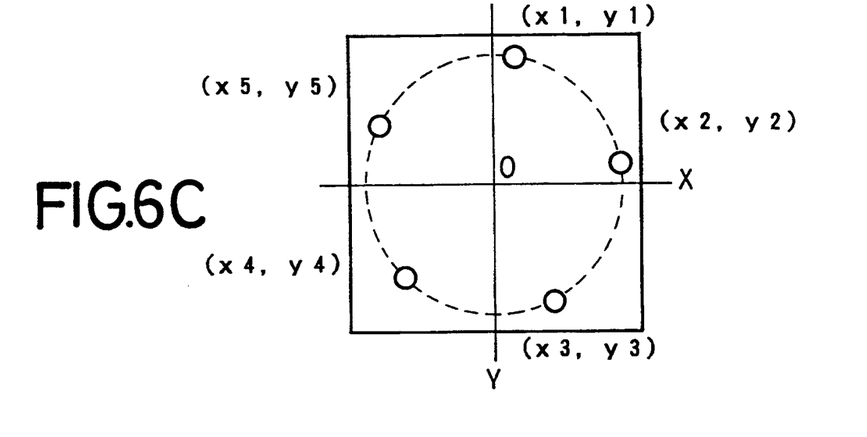

The image processing apparatus 22 extracts points recognized as the heads of hub bolts from the inputted images and determines respective coordinates of the recognized points on respective image screens (see FIG. 6C). Then, the image processing apparatus 22 outputs data (X1, Y1), (X2, Y2), (X3, Y3), (X4, Y4) and (X5, Y5) indicative of the respective coordinates of the recognized points to the arithmetic unit 16 (Step S5).

The arithmetic unit 16 computes new center coordinates O, to be described later, a turning angle $\theta 1$ and a rotational position $\theta 2$, of the front wheel hub FH based on the data indicative of the respective coordinates of the recognized points referred to in the above (Step S6).

Next, the arithmetic unit 16 determines whether or not the turning angle $\theta 1$ is less than a predetermined angle $\alpha$ (Step S7). If $\theta 1$ is less than $\alpha$, then the arithmetic unit 16 outputs information about the center coordinates O, the turning angle $\theta 1$ and the rotational position $\theta 2$, of the front wheel hub FH to the robot controller 14. In this embodiment, $\alpha$ is set to 8° based on experiments.

The robot controller 14 energizes the wheel mounting robot 28 of the robot main body 12 based on the information outputted from the arithmetic unit 16 so as to mount a desired wheel W gripped by the chucking unit 36 to the front wheel hub FH of the vehicle S (Step S8).

If, on the other hand, the turning angle $\theta 1$ exceeds the predetermined angle $\alpha$, then an alarm is sounded (Step S9) and the control of the wheel mounting robot 10 is terminated, because the wheel W will come to contact with a part of the body in this condition, making it impossible to mount the wheel W to the front wheel hub FH.

When the wheel W has been mounted to the front wheel hub FH in Step S8, another wheel W is mounted to a rear wheel hub RH in accordance with the operational sequence similar to those executed in Steps S1 through S7 (Step S10). At this time, in Step S1, the fixed camera 20 takes or scans image of the rear wheel hub RH and effects the approximately detecting process on the rear wheel hub RH. The wheels W are thus mounted to their corresponding front and rear wheel hubs FH, RH of the vehicle S in accordance with the above steps.

Figure 4:
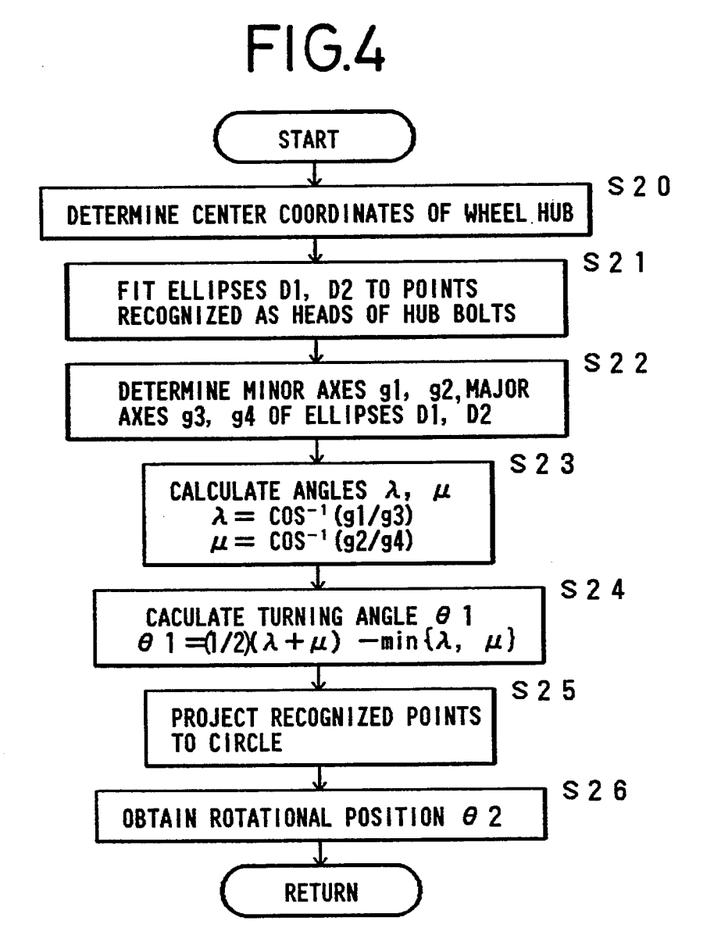
FIG. 4 is a flowchart for describing an operation on the flowchart shown in FIG. 3, for computing a rotational position of the hub.

Steps for computing the new center coordinates O, the turning angle $\theta 1$ and the rotational position $\theta 2$ of the front hub FH in the above Step S6 will next be described in detail with reference to a flowchart shown in FIG. 4.

The arithmetic unit 16 determines the center coordinates O of the front hub FH based on the data indicative of the coordinates of the heads of the respective hub bolts, which have been determined in Step S5 (Step S20).

Next, the arithmetic unit 16 connects the respective points recognized as the heads of the hub bolts with curves thereby to find a best fitted ellipse D1, which shows the minimum fitting error (Step S21).

Here, the points recognized as the heads of the hub bolts are those having predetermined luminance or more. Therefore, there is a risk of identifying or recognizing a wrong position as the head of the hub bolt due to a strongly reflected light from that portion, or noise which enters during transmission of data.

Figure 7A:
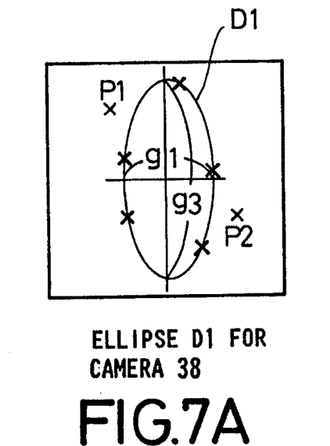
FIGS. 7A to 7D are views for describing images of a wheel hub, which are processed in accordance with the flowchart depicted in FIG. 3.

Therefore, the arithmetic unit 16 successively tries a plurality of ellipses and compare the fitting error between them to find an ellipse D1 whose fitting error is the minimum (see FIG. 7A). As a result, points which are spaced away from the ellipse D1, are regarded as not being the heads of the hub bolts and hence they are eliminated.

Figure 7B:
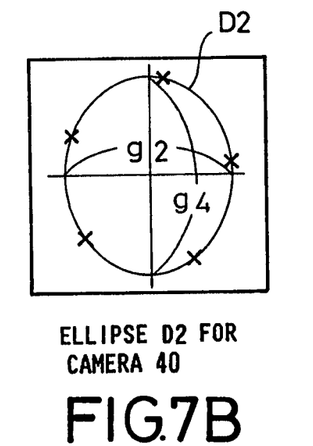
Figure 7C:
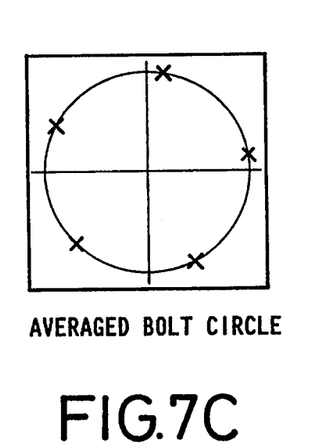

The arithmetic unit 16 processes an image of the rear wheel hub RH taken by the camera 40 in the same manner as described above, i.e., determines an ellipse D2 in accordance with the fitting trials similar to those by which the ellipse D1 is determined (see FIG. 7B).

Next, the arithmetic unit 16 determines the lengths of the minor and major axes g1, g3 of the ellipse D1 and the lengths of the minor and major axes g2, g4 of the ellipse D2 (Step S22), and calculates angles $\lambda$, $\mu$ (Step S23) between the normal line of the hub face and the respective optical axes of the cameras 38 and 40 by $$\lambda = \cos^{-1}(g1/g3), \text{ and}$$

$$\mu = \cos^{-1}(g2/g4).$$

The arithmetic unit 16, then, calculates the turning angle $\theta 1$ of the hub (see FIG. 6A) (Step S24) by $$\theta 1 = (\tfrac{1}{2})(\lambda + \mu) - \min\{\lambda, \mu\}.$$

Here, it has been found preferable from experiments that the angle $(\lambda + \mu)$ which is an angle at the hub in a path of camera 38—hub-camera 40 is not less than 60°.

Then, the arithmetic unit 16 projects the points recognized as the heads of the hub bolts on each of the ellipses D1 and D2 onto circles each having a diameter of g3 or g4 (Step S25). Further, two circles are averaged into one circle and angular distances between adjacent respective points are determined.

Two points on both sides of a determined angular distance substantially coincident with a given angular distance, for example, 72° when the number of the hub bolts is five, are determined as being the hub bolts. However, if the determined angular distance does not coincide with the given angular distance, at least one of these two points can be a wrong point.

Figure 7D:
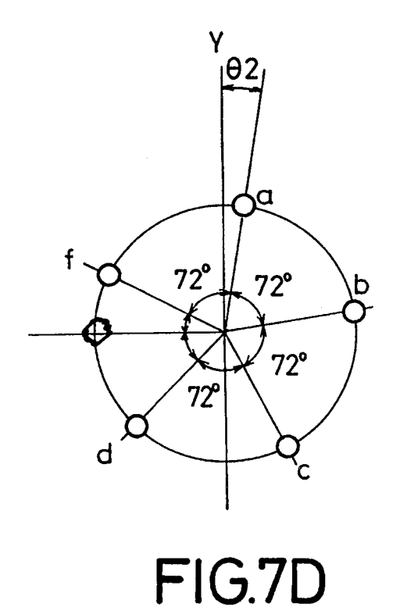

In FIG. 7D, the angular distances between the points d and e and between the points e and f do not coincide with 72°. It is therefore determined that the point e does not represent the hub bolt, and data about the point e is eliminated. Accordingly, the points a, b, c, d and f are extracted as the heads of the hub bolts in this case.

Next, an angle between a vertical line Y passing the center O of the front wheel hub and a radius of the circle passing a hub bolt located at the nearest to the vertical line is determined to be the rotational position $\theta 2$ (Step S26).

The wheel mounting robot 10 mounts the wheel W to the target wheel hub based on the center coordinates O, the turning angle $\theta 1$, and the rotational position $\theta 2$ of the wheel hub which have been determined according to the steps described above.

In the wheel mounting method according to the present invention, the accuracy in detecting positions of hub bolts is improved because the second imaging means are provided with the possible largest images of the wheel hub and hub bolts by the aid of the first imaging means. Further, the turning angle of the wheel hub can be easily and quickly detected by the use of ellipses fitted to the points recognized as heads of hub bolts. Geometry of ellipses greatly simplifies the calculation of the turning angle of the wheel hub, compared to the use of polygons.

Having now fully described the invention, it will be apparent to those skilled in the art that many changes and modifications can be made without departing from the spirit or scope of the invention as set forth herein.

What is claimed is:

1. A method of mounting a wheel, by a wheel mounting robot, to a vehicle conveyed along an assembly line, comprising the steps of:

obtaining an image of a wheel hub by first imaging means disposed on one side of said conveyed vehicle;

calculating approximate coordinates of the center of said wheel hub based on the image obtained by said first imaging means;

locating second imaging means mounted on said wheel mounting robot so that respective said second imaging means are located in front of said wheel hub and symmetrically with respect to the center of said wheel hub, according to said approximate coordinates of the center of said wheel hub;

calculating revised coordinates of the center of the wheel hub and a rotational displacement from a standard rotational position of the wheel hub, based on said images obtained by said second imaging means; and mounting the wheel to said wheel hub by said wheel mounting robot based on the revised coordinates of the center and rotational position of said wheel hub.

2. The method according to claim 1, wherein said step of calculating the revised coordinates of the center of said wheel hub and the rotational displacement of said wheel hub comprises the steps of:

projecting said points recognized as the heads of the hub bolts on each of said ellipses onto circles each having a diameter of the length of the major axis of each of said ellipses;

averaging said circles into one circle and determining the coordinates of the center of said wheel hub which is the center of said one circle;

determining angular distances each defined by neighboring radii passing respective said points in said one circle;

comparing each of said determined angular distances with a predetermined angle to verify whether or not the points on both sides of each of said determined angular distances are false images of the hub bolts; and determining the rotational displacement of said wheel hub by finding an angle between a vertical line passing through the center of said wheel hub and a radius passing through one of said verified points which is the nearest to said vertical line.

3. The method according to claim 1, further comprising a step of outputting a wheel-mounting disable signal when said turning angle exceeds a predetermined angle.

4. A method of mounting a wheel, by a wheel mounting robot, to a vehicle conveyed along an assembly line, comprising the steps of:

obtaining an image of a wheel hub by first imaging means disposed on one side of said conveyed vehicle;

calculating approximate coordinates of the center of said wheel hub based on the image obtained by said first imaging means;

locating second imaging means mounted on said wheel mounting robot so that respective said second imaging means are located in front of said wheel hub and symmetrically with respect to the center of said wheel hub, according to said approximate coordinates of the center of said wheel hub;

calculating revised coordinates of the center of the wheel hub and a rotational displacement from a standard rotational position of the wheel hub, based on said images obtained by said second imaging means;

extracting points recognized as the heads of hub bolts studded on said wheel hub based on each of said images obtained by said second imaging means;

connecting said recognized points in each of said images with a curve to find a best fitted ellipse;

finding a ratio of the lengths of the minor and major axes of said ellipse in each of said images to determine the direction of the normal of a hub bolt circle with respect to an optical axis of each of said second imaging means;

determining a turning angle of the wheel hub toward the right or left with respect to a progressive direction of the vehicle based on said direction of the normal of the hub bolt circle determined for each of said second imaging means; and mounting the wheel to said wheel hub by said wheel mounting robot based on the revised coordinates of the center, rotational displacement, and turning angle of said wheel hub.

* * * * *